United States Patent [19]

Abdel-Malek et al.

[11] Patent Number: 5,497,777
[45] Date of Patent: Mar. 12, 1996

[54] SPECKLE NOISE FILTERING IN ULTRASOUND IMAGING

[75] Inventors: Aiman A. Abdel-Malek, Schenectady, N.Y.; Max H. M. Costa, San Gabriel, Calif.

[73] Assignee: General Electric Company, Schenectady, N.Y.

[21] Appl. No.: 311,698

[22] Filed: Sep. 23, 1994

[51] Int. Cl.$^6$ ................................................ A61B 8/00
[52] U.S. Cl. ........................................... 128/660.07
[58] Field of Search .................. 128/660.06, 660.07, 128/661.01; 73/602; 382/276

[56] References Cited

U.S. PATENT DOCUMENTS

| | | | |
|---|---|---|---|
| 4,817,015 | 3/1989 | Insana et al. | 364/507 |
| 5,245,589 | 9/1993 | Abel et al. | 367/136 |
| 5,253,530 | 10/1993 | Letcher, III | 73/602 |
| 5,347,479 | 9/1994 | Miyazaki | 364/725 |
| 5,388,182 | 2/1995 | Benedetto et al. | 395/2.14 |
| 5,392,255 | 2/1995 | LeBras et al. | 367/50 |
| 5,414,780 | 5/1995 | Carnahan | 382/276 |
| 5,420,636 | 5/1995 | Kojima | 348/403 |
| 5,420,891 | 5/1995 | Akansu | 375/350 |

OTHER PUBLICATIONS

W. Press et al., "Numerical Recipes in Fortran", Cambridge University Press, Second Edition, Chapter 13, pp. 584–599.
S. Mallat, "A Theory for Multiresolution Signal Decomposition: the Wavelet Representation", IEEE Trans. on Pattern Analysis and Machine Intelligence, vol. 11, No. 7, Jul. 1989, pp. 674–693.
S. Mallat, "Characterization of Signals from Multiscale Edges", IEEE Trans. on Pattern Analysis and Machine Intelligence, vol. 14, No. 7, Jul. 1992, pp. 710–732.
I. Daubechies, "Orthonormal Bases of Compactly Supported Wavelets", Comm. Pure Applied Math., vol. 41, pp. 909–996, 1988.
I. Daubechies, "The Wavelet Transform, Time–Frequency Localization and Signal Analysis", IEEE Trans. on Information Theory, vol. 36, No. 5, Sep. 1990, pp. 961–1005.

Primary Examiner—Francis Jaworski
Attorney, Agent, or Firm—Marvin Snyder

[57] ABSTRACT

The enhancement of ultrasound images is provided through the filtering of signal dependent noise such as speckle noise by dividing the signal into selective subintervals and utilizing discrete wavelet transform and the identification and selection of those wavelet transform coefficients primarily including signal and not those primarily including signal dependent noise.

23 Claims, 6 Drawing Sheets

$$A = \begin{bmatrix} c_0 & c_1 & c_2 & c_3 & & & & & & & \\ c_3 & -c_2 & c_1 & -c_0 & & & & & & & \\ & & c_0 & c_1 & c_2 & c_3 & & & & & \\ & & c_3 & -c_2 & c_1 & -c_0 & & & & & \\ \cdot & \cdot & & & & & \cdot & & & & \\ \cdot & \cdot & & & & & & \cdot & & & \\ \cdot & \cdot & & & & & & & & & \\ & & & & & & c_0 & c_1 & c_2 & c_3 \\ & & & & & & c_3 & -c_2 & c_1 & -c_0 \\ c_2 & c_3 & & & & & & & c_0 & c_1 \\ c_1 & -c_0 & & & & & & & c_3 & -c_2 \end{bmatrix}$$

Filter G → (first two rows), Filter H (columns $c_0, c_1, c_2, c_3$)

SPECKLE NOISE FILTERING IN ULTRASOUND IMAGING

BACKGROUND OF INVENTION

This invention relates to coherent or in-phase imaging using vibratory energy, such as ultrasound imaging, and, in particular, to the filtering of signal dependent noise such as speckle noise to enhance the imaging signal.

There are a number of methods in which vibratory energy, such as ultrasound, is used to produce images of objects, such as in medical applications for imaging internal areas of patients for diagnostic purposes. An ultrasonic transducer array is used for both transmission and reception of ultrasonic pulses with an image produced in which the brightness of each pixel of the image is a function of the amplitude of the ultrasound reflected from the imaged object to the receiver which in turn is determined by the differences in characteristics or materials of the object being imaged.

Ultrasonic transducers for medical applications are constructed from one or more piezoelectric elements sandwiched between a pair of electrodes. When an appropriate voltage pulse is applied, the piezoelectric element emits an ultrasonic pulse into the medium such as the patients body. Conversely, when an ultrasonic echo pulse strikes the piezoelectric element, the piezoelectric element produces a corresponding voltage across its electrodes. A number of such ultrasonic transducer constructions are disclosed in U.S. Pat. Nos. 4,217,684; 4,425,525; 4,441,503; 4,470,305 and 4,569,231, all of which are assigned to the same assignee as the present invention.

The ultrasound transducer typically has a number of piezoelectric elements arranged in an array such that by properly controlling the relative time delays of the applied voltages on each element, the ultrasonic waves produced by the piezoelectric elements can be made to combine to produce a net ultrasonic wave focused at a selected point. This focal point can be moved on each successive transmitter firing, so that the transmitted beams can be scanned across the object without moving the transducer.

Similar principles apply when the transducer is employed to receive the reflected sound. The voltages produced at the transducer elements in the array are individually delayed in time and then summed together such that the net received signal or "beamsum" is dominated by the received sound reflected from a single receive focal point in the subject. The individual pixels when combined provide an image of the imaged object, such as a fetus, or an internal organ or object of the human body.

However, any noise or incoherent signals present in the beamsum signal detracts from the image quality through destructive interference such that various methods of filtering noise out of the received signal to enhance image presentation and imaging have been used or attempted. However, present filtering methods are not completely satisfactory. Signal dependent noise, an example of which is speckle noise, commonly observed in coherent imaging systems such as ultrasound systems for medical and industrial purposes and even in Synthetic Aperture Radar (SAR) and laser imaging cannot be properly or adequately handled by conventional filtering techniques. Speckle noise visually shows up on an ultrasound image not too unlike the familiar "snow" or noise spotting of television images provided by a home television receiver, although the noise distribution is Poisson distribution rather than the Raleigh distribution of speckle noise.

Conventional techniques for filtering additive noise in ultrasound imaging often fail if the noise is multiplicative or signal dependent. In many applications, particularly medical ultrasound imaging, loss of the true or information containing signal as a result of the filtering operation is highly undesirable or unacceptable for diagnostic imaging. Noise filtering techniques which are based on Fourier analysis assume that the noise is dominant in the higher frequencies. Such an assumption is often crude and inaccurate for various types of signals. Various attempts to remove speckle noise have not been satisfactory. Therefore, a key feature of denoising ultrasound signals is to retain important signal information while removing as much of the noise as possible to improve the signal to noise ratio (SNR).

The present invention utilizes wavelet transforms to enhance ultrasound imaging and is robust in the sense that minimal assumptions about the noise characteristics are imposed such that a wider variety of noise can be filtered. In addition, the technique enables better noise characterization, thus permitting preservation of the important features of the signal of interest.

OBJECTS AND SUMMARY OF THE INVENTION

The present invention relates to speckle noise filtering particularly in ultrasound applications such as medical ultrasound imaging to provide improved image diagnostic quality.

It is an object of the present invention to provide improved filtering of noise including speckle noise in ultrasound imaging to enhance the resultant image.

It is another object of the present invention to provide improved filtering of noise which is multiplicative or signal dependent in ultrasound imaging to improve the signal to noise ratio.

It is yet another object of the present invention to provide wavelet transforms in the signal processing of ultrasound imaging signals to enhance the resultant image and which technique is suitable for retrofitting or addition to existing ultrasound equipment, whether digital or analog based.

In accordance with one form of the present invention, an adaptive method for reducing signal dependent noise such as speckle noise in a coherent imaging system signal such as used in medical ultrasound imaging comprises dividing the imaging signal into overlapping equal numbers of subintervals, transforming each of the subintervals using a discrete wavelet technique, identifying for each subinterval whether the wavelet transform coefficient comes from noise or from the actual or true signal, selecting those wavelet coefficients which are identified as signal-related, deleting those coefficients that relate to noise, and passing the remaining wavelet coefficients through an inverse discrete wavelet transform to provide an enhanced signal with reduced noise.

The division of the imaging signal system is into frequency and time intervals of differing selected intervals based on signal dimensions. The identification of those wavelet coefficients related to the actual signal is provided automatically through a threshold factor determination which automatically varies the threshold for each wavelet scale, enabling automatic identification of signal-related wavelet coefficients.

DESCRIPTION OF THE PREFERRED EMBODIMENT

Figure 1:
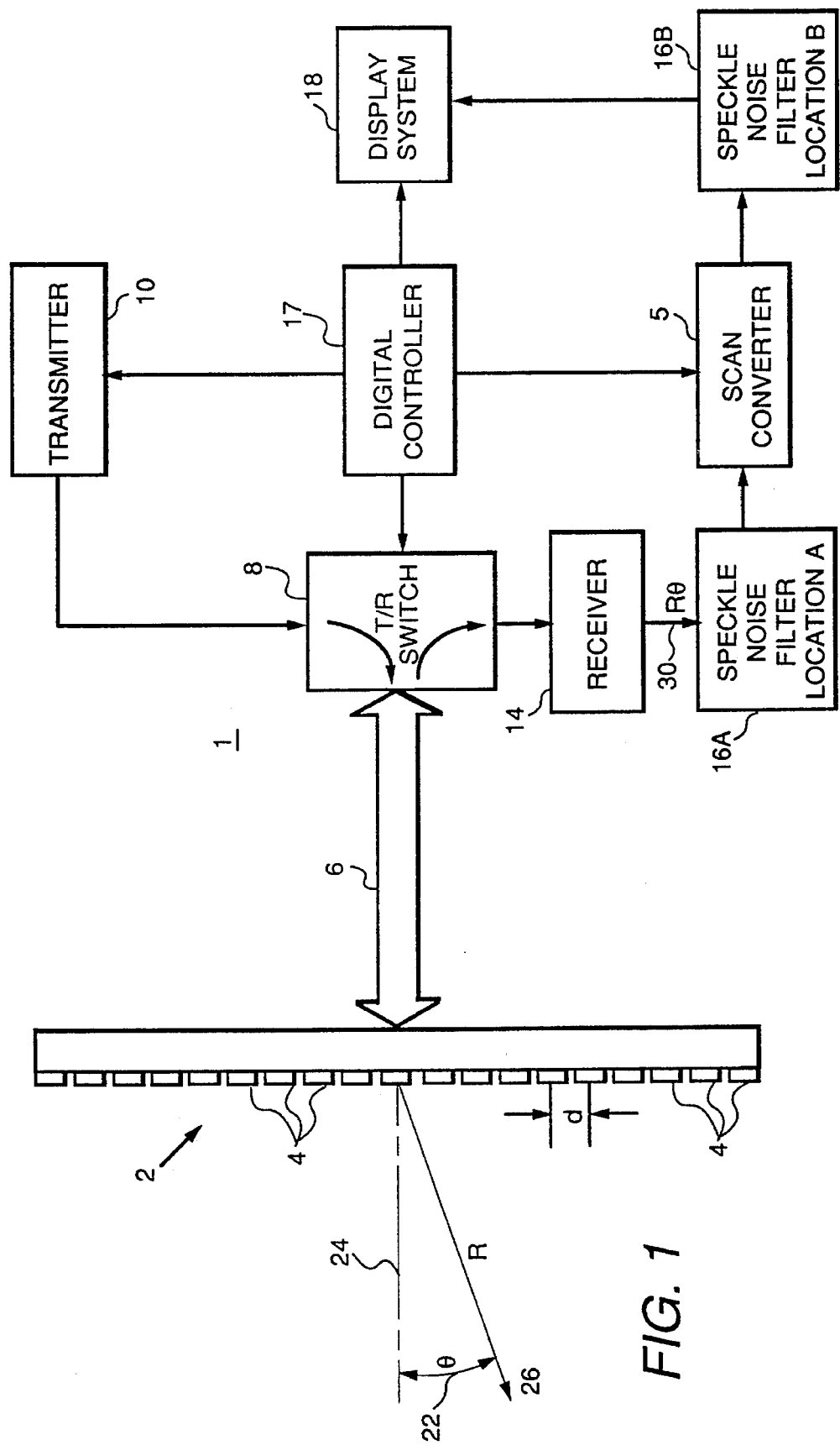
FIG. 1 is a simplified block diagram of an ultrasound system incorporating the present invention.

As shown in FIG. 1, a vibratory energy imaging system 1 includes a transducer array 2 comprised of a plurality of separately driven elements such as 4 which each produce a burst of vibratory energy, such as ultrasonic energy, when energized by a pulse produced by a transmitter 10. The vibratory energy reflected back to transducer array 2 from the subject or object under study is converted to an electrical signal by each transducer element 4 and applied separately to receiver 14 through a set of transmit/receive switches 8. Transmitter 10, receiver 14 and switches 8 are operated under control of a digital controller 17 responsive to commands inputed by a human operator. Each scan line in the image provided on display system 18 is constructed by acquiring a series of echoes in which switches 15 are set to their transmit position, transmitter 13 is gated on momentarily to energize each transducer element 4, the switches are set to their receive position, and the subsequent echo signals produced by each transducer element are applied to receiver The separate echo signals from each transducer element 4 are combined in receiver 14 to produce a single echo signal corresponding to a single scan line. Display system 18 receives the series of data samples produced by receiver 14 for all the scan lines after being converted by scan converter 5 to X-Y display coordinates. Scan converter 5 converts the (Rθ) signals or range beam angle signals into display coordinates (X-Y) coordinates to a form producing one frame of the desired image which may be in wedge form for visual display.

Transmitter 10 drives transducer array 2 such that the vibratory energy produced, (e.g., ultrasonic energy), is directed, or steered, and focused in a beam. A typical ultrasound system may utilize 192 beams or pulses transmitted in different directions spanning a wedge. A complete scan can therefore be performed by moving this beam through an angle θ or 22 from center line 24 of transducer array 2. Transmitter 10 produces a voltage pulse for each transducer element at a specifiable time. For a detailed description of a suitable transmitter 10, reference is made to commonly assigned U.S. Pat. No. 5,014,712 issued on May 14, 1991, and entitled "Coded Excitation For Transmission Dynamic Focusing of Vibratory Energy Beam", which is incorporated herein by reference.

The echo signals produced by each burst of ultrasonic energy emanate from reflecting objects located at successive positions along the scan line direction. These are sensed separately by each element 4 of transducer array 2. The function of receiver 14 is to amplify these separate echo signals, to impart the proper time delay to each, and to sum them together to provide a single echo signal which accurately indicates the total ultrasonic energy reflected from the receive focal point 26. The ultrasound equipment reads the range and depth, typically in digital form, of some 1152 samples for the range.

Receiver 14 produces for each transducer element 4 demodulated digital signals delayed by a specifiable time. For a more detailed description of a suitable receiver 14, reference is made to commonly assigned U.S. Pat. No. 4,983,970 issued on Jan. 8, 1991 and entitled "Method And Apparatus for Digital Phase Array Imaging", which is incorporated herein by reference.

Figure 2:
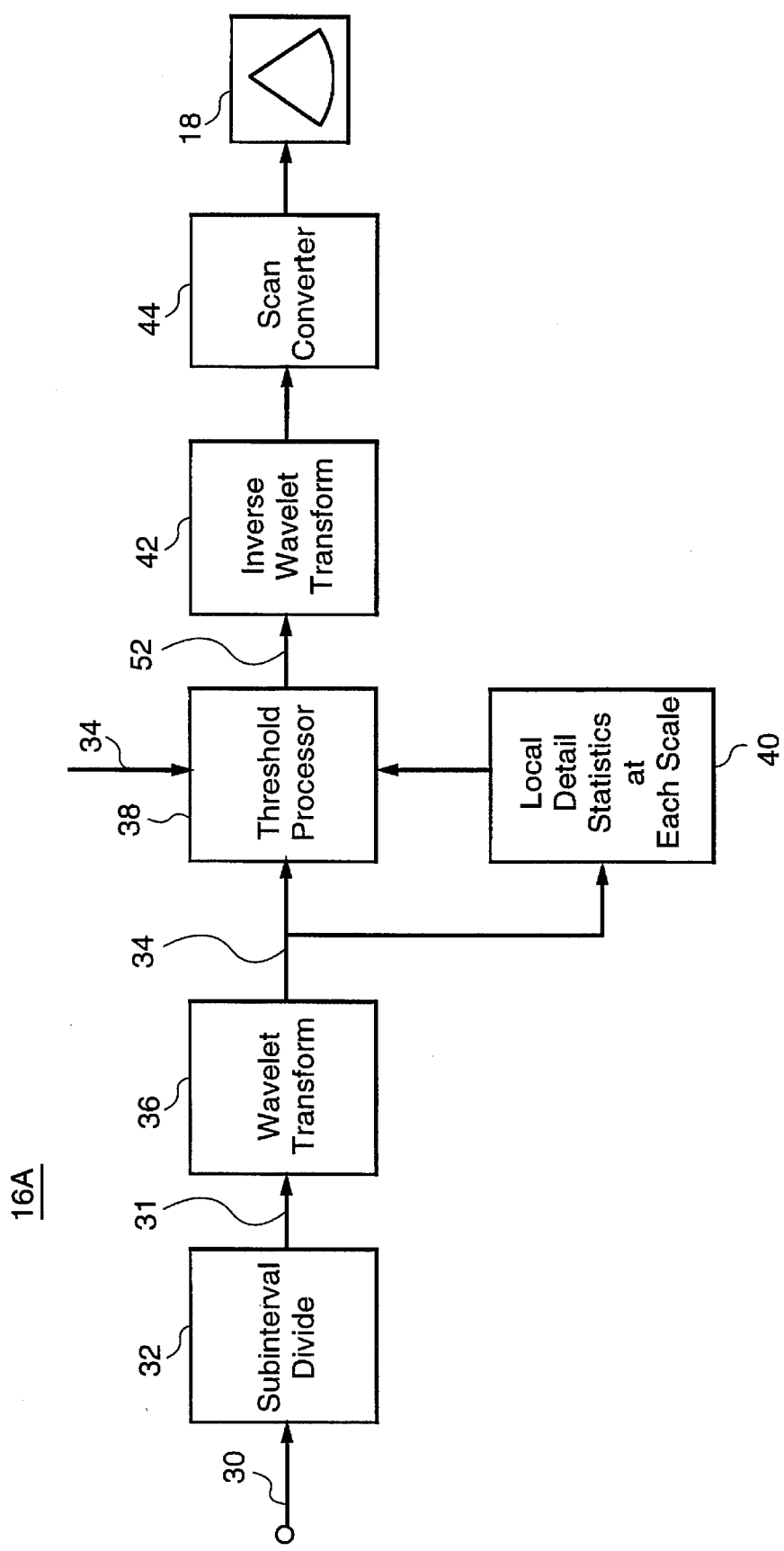
FIG. 2 is a block diagram showing details of the speckle filter of FIG. 1.

Refer next to FIG. 2. Ultrasound signal 30 including range and depth information, or Rθ signals, from receiver 14 of FIG. 1 is provided as an input 31 to wavelet transform 36 after being divided into subintervals which can be overlapping by subinterval divide 32 for each beam angle θ. Wavelet transform 36 then divides ultrasound range signals 31 into overlapping subintervals or segments of length "LN". For each subinterval "LN" a discrete wavelet transform (DWT) is applied by wavelet transform 36 to provide a hierarchical frequency-scale space representation 34.

Figure 3:
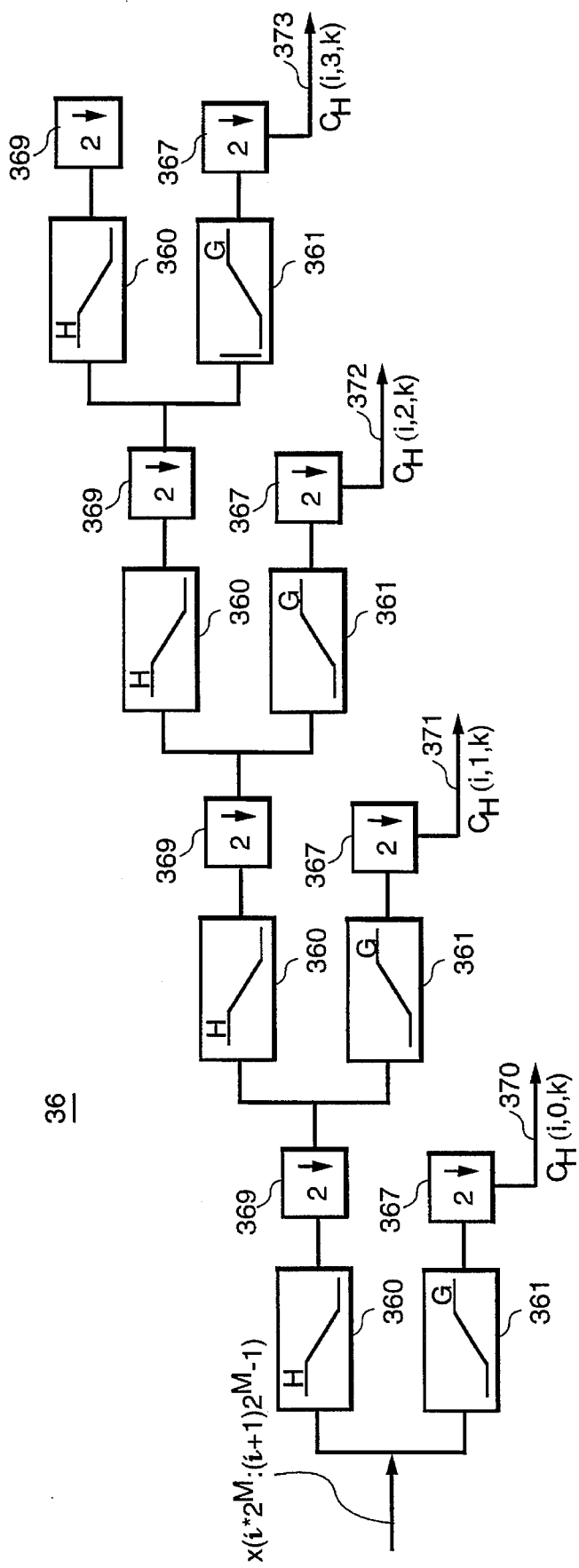
FIG. 3 is a block diagram of the wavelet transform processor of FIG. 2.
Figure 5:
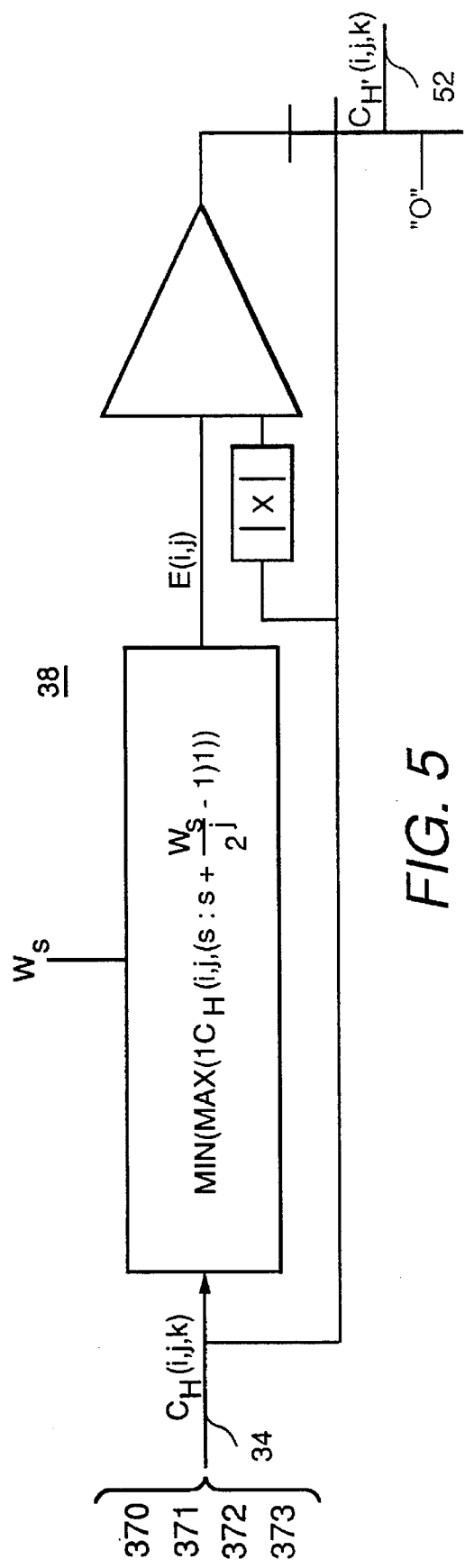
FIG. 5 is a block diagram of the threshold processor of FIG. 2.

Details of wavelet transform processor 36 are shown in FIG. 3. A particular wavelet is specified by a particular set of numbers, or wavelet filter coefficients; with the simplest wavelet having only four coefficients $C_0$, $C_1$, $C_2$, and $C_3$. An example of suitable wavelets are the Haar wavelet and the Daubechies wavelet. These wavelets are discussed in "Wavelets: A Tutorial in Theory Applications" by Charles Chin, Academic Press Inc., London, UK 1992, incorporated herein by reference. Unlike Fourier transform which utilizes sines and cosines as its basis, wavelet functions are localized in space (time) and like sines and cosines they are also localized in frequency or more precisely characteristic scale. This dual localization characteristics by wavelets can provide high computational advantage when data are analyzed in the wavelet domain. Referring to FIG. 3, input signal 31 is provided to pairs of compute blocks or stages 360, 361, which are the digital filter realization of the wavelet transform. Compute block 360 is a smoothing filter, or H, with FIG. 5 showing the frequency response characteristics of the filter H which for a four coefficient filter acts as a moving average of four samples of signal 31. Compute blocks 361 are the detail filters, or G, whose frequency response is a mirror image of that of the smoothing filter 360 or H.

Accordingly, H (360) and G (361) as shown in FIG. 3 are referred to as quadrature mirror filters in digital signal processing terminology. Due to the mirror image relation of the frequency responses of H and G, the output of filter H block 360, reduced by half in divider 369 essentially "throws away" half the values, and accurately represents input signal 31 "smooth" information. The output of filter G block 361, similarly reduced by half in divider 367, accurately represents input signal 31 "detail" information.

As shown in FIG. 3, $C_H$ (i,0,k) signal 370 is the detail wavelet coefficient at scale zero which is the finest resolution. $C_H$ (i,1,k) signal 371 is a detail wavelet coefficient at scale one, which provides a lesser resolution. Similarly, $C_H$ (i,2,k) signal 372 is a detail wavelet coefficient at a still lesser resolution, while $C_H$ (i,3,k) is the detail wavelet coefficient at the lowest resolution level of the four coefficient filter of FIG. 3.

Figures 4A, 7:
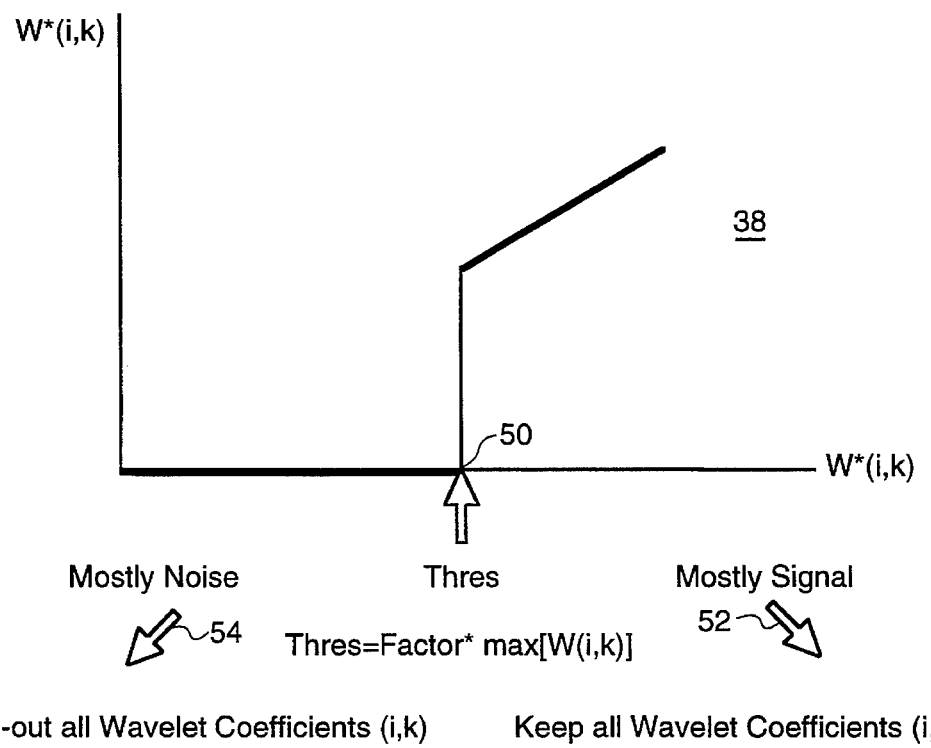
FIGS. 4A and 4B are diagrams useful in explaining the identification of the intervals containing signal information.
FIG. 7 is a simplified diagram showing the filtering action involved in the wavelet transform.
Figure 4B:
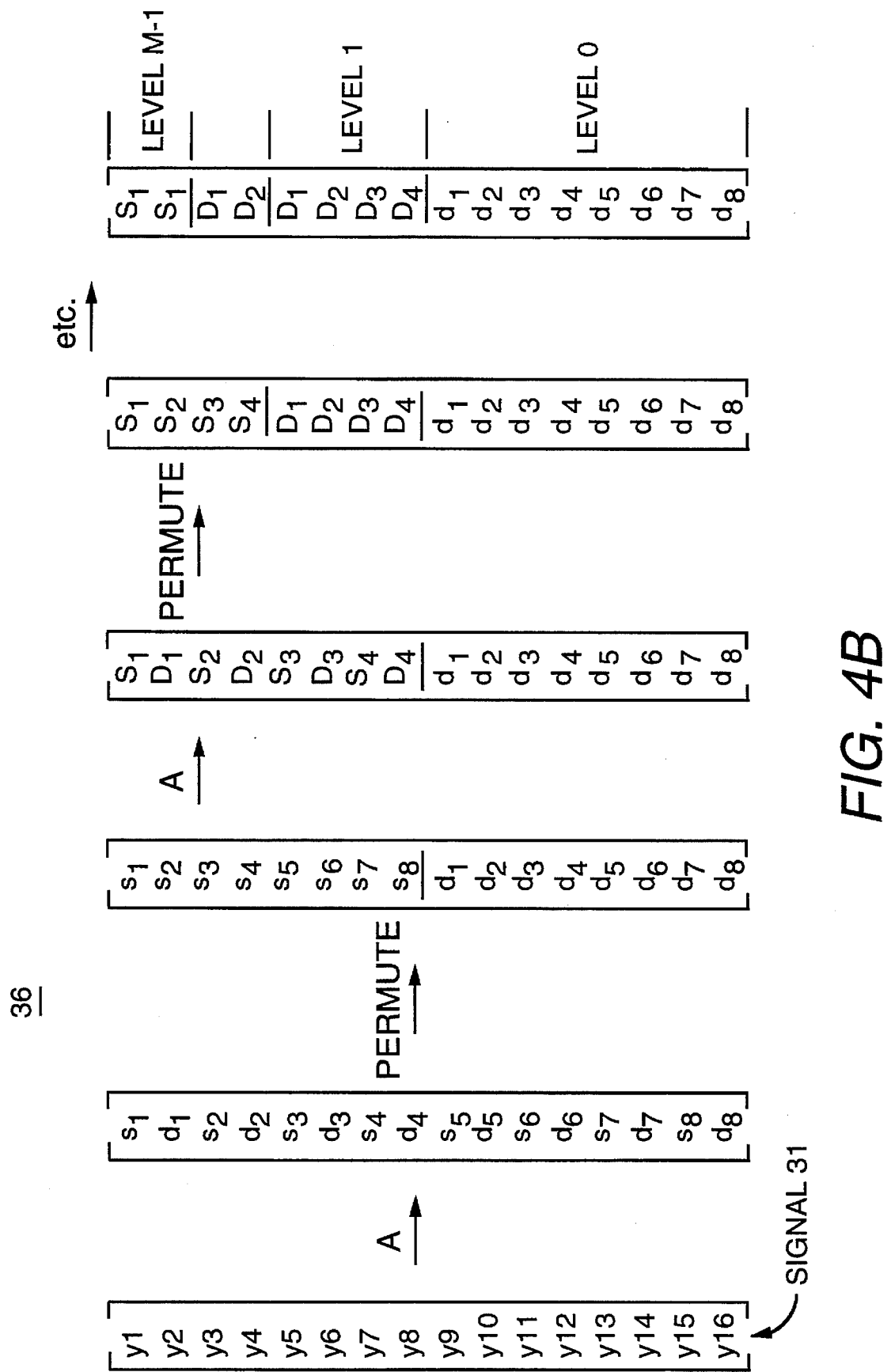

Input signal 31, representing a specific subinterval data sample, is transformed as a vector of sampled data [$y_1$, $Y_2$ ... $Y_n$] as shown in FIG. 4A and 4B Referring to FIG. 4A the wavelet transform filter coefficients H and G are represented in the form of orthogonal transformation matrix "A" which acts on the column vector of input signal 31 as described in detail in Press, W., et al. "Numerical Recipies: The Art of Scientific Computing" Second Edition, Cambridge Univ. Press, 1992, incorporated herein by reference. FIGS. 4A and 4B show the simplest wavelet form which consists of 4 coefficients [$C_0$, $C_1$, $C_2$, $C_3$]representing the H smoothing filter and another 4 coefficients [$C_3$ $-C_2$ $C_1$ $-C_0$] representing the detail filter of FIG. 3. The blanks in the wavelet transform matrix "A" signify zeros. The odd rows of the matrix generate the components of the input data circularly convolved with the smoothing filter H coefficients to produce the [$S_1$, ... $S_{n/2}$]transform components 34 of FIG. 2. Likewise, the even rows perform the circular convolution of the data with the detail filter G coefficients to produce the [$d_1$, $d_2$, ... $d_{N/2}$] detail components of the transformed data. The overall action of the matrix is to perform two related circular convolutions and decimate each of them by half and interleave the remaining halves as shown in FIG. 3.

The DWT (discrete wavelet transform) consists of applying the wavelet coefficient matrix "A" hierarchically, first to the full (subinterval sample) data vector of length N, then to the "smooth" vector of length N/2, and so on until only 2 smooth components are the only ones left, and all the remaining components are "detail" components that were accumulated along the way representing the details information in the subinterval at various levels of resolution marked as level 1 (finest resolution) to level M (coarsest resolution).

The ability to separate the detail information from the input data stream at various selective scales (frequency bands) is unique to wavelet transform. This enables the separation of wavelet transform "detail" coefficients that are due to real or true signal from those due to signal dependent noise such as speckle noise.

Threshold processor 38 (see FIG. 2) is provided to enable selection of those detail coefficients which primarily include actual signal information. Local variance information at various selected scales as provided by local statistics at each scale 40 to threshold processor 38 enable selection of those wavelets which primarily include signal information. Selection may be accomplished automatically or by manually inputing threshold processor 38 through manual input 39.

Details of a threshold function processor 38 are shown in FIG. 5. Referring to FIG. 5, detail coefficient vector outputs 370, 371, 372 and 373 of compute blocks 361 (see FIG. 3) are applied as input signal 34 shown as $C_H$ (i,j,k) in which:

i=index for coefficient location in a specific scale "J" and subinterval "k"

J=index for wavelet scale (level) for a subinterval "k"

k=index for subinterval

M=total number wavelet scales for a given subinterval.

Two methods for selecting the thresholding factors are possible, namely automatic or manual control. In the automatic control method the threshold function processor 38 implements a non-linear function for each scale (level of resolution) j=0 to M–3 which compares each output C[i,j, k]over a user sample length $W_s/2^j$ for each j to determine the minimum of the $2^{(M-j-1)} -W_s/2^j$ maximum values of the absolute value (or the square) of the C[i,j,k] within the window $W_s/2^J$ This minimum is E(i,j). The starting point, s, goes from 0 to $2^{(M-j-1)}-1-W_s/2^j$. Each C[i,j k] within the specific subinterval k less than E (i, j) is zeroed while the others are unchanged. Output 52 of the threshold function processor 38 is C'$_H$(i,j,k).

In Manual Factor Selection, for each scale (level), the operator determines the threshold factor multiplier depending on the amount of noise that can be removed with little compromise of signal resolution. Higher factor values result in more wavelet coefficients being zeroed out at that specific scale. Factors are determined based on what is visually acceptable quality (in case of an image) to the user, and on the minimum loss of important signal information. After viewing the image, the operator adjusts the threshold level by manual adjustment 39 which may be manually varied to provide optimum image resolution.

Threshold processor 38 thus eliminates noise without distortion of the true image signal. The inverse wavelet transform 42 is a simple reverse of the procedure of FIG. 3, starting with the smallest level of resolution and working from right to left in FIG. 3, and multiplying by the inverse of the transform matrix "A", which due to the condition of orthogonality is equal to the transpose of the matrix ($A^{-1}$= $A^T$ for orthogonal matrices. After the thresholding operation is completed, the remaining wavelet coefficients $C'^H$(i,J,k) are inverse wavelet transformed to produce the denoised signal (speckle reduced subinterval).

Figure 6:
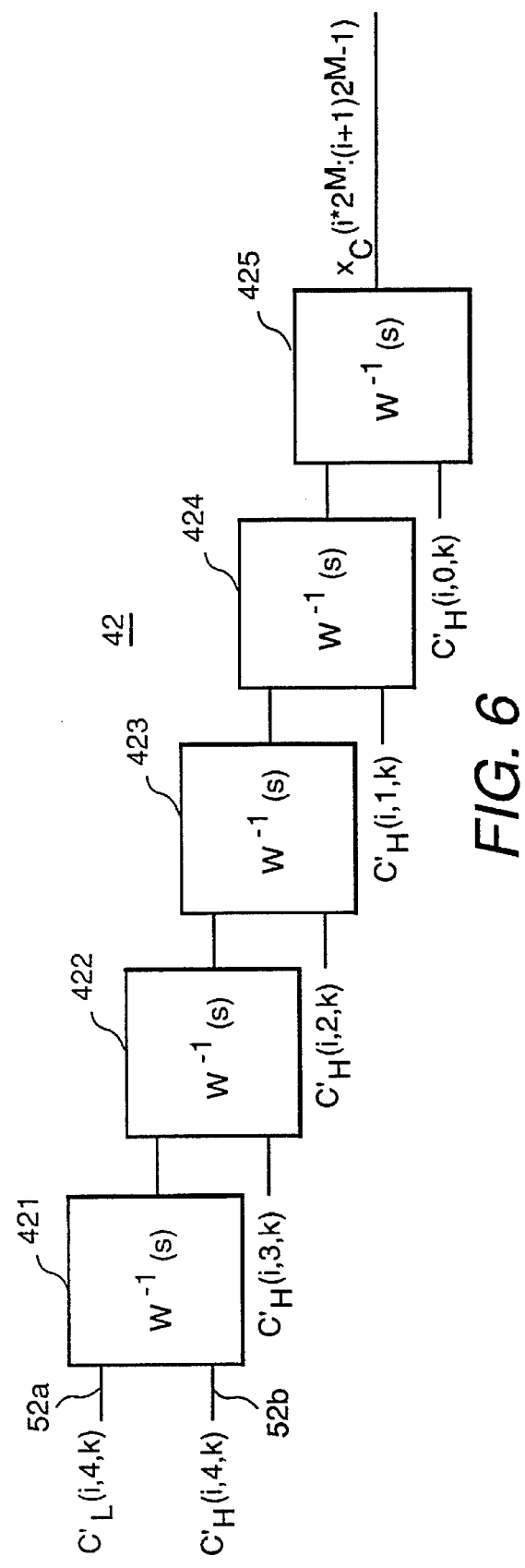
FIG. 6 is a block diagram of the inverse wavelet transform processor of FIG. 2.

Details of inverse wavelet transform processor 42 are shown in FIG. 6. Referring to FIG. 6, in inverse wavelet transform processor 42 the C'$_L$(i,j,k) and C'$_H$(i,j,k) outputs of threshold processor 38 are combined to reconstruct the speckle removed data. Each block 421, 422, 423, 424, 425 labeled $W^{-1}$(s) performs the following operation:

$$x(2n) = \sum_{p=0}^{\frac{1}{2}-1} h_{2p}C_L'(i,j,MOD_M(n+p)) +$$

$$h_{2p+1}C_H'(i,j,MOD_M(n+p))$$

$$x(2n+1) = \sum_{p=0}^{\frac{1}{2}-1} g_{2p}C_H(i,j,MOD_M(n+p)) +$$

$$g_{2p+1}C_L(i,j,MOD_M(n+p))$$

where:

n=0→$_2{}^{M-j-1}$ 31 1

This operation is performed for the C'[i, j, k] data streams 52a and 52b, respectively, resulting in $x_C$ and $x_D$ data streams. This is repeated for all subintervals until the whole ultrasound signal 30 is processed.

As shown in FIG. 2, the output of inverse wavelet transform 42, including the processed and enhanced (minus speckle) range theta image 31 is applied to scan converter 44 which, in a manner well known in the ultrasound art, transforms the beams by linearly interpolating between beams to provide a continuous wedge display through conversion of the range-theta signals into XY coordinates for display by display system or display unit 18.

As shown in FIG. 1 the subject invention may be utilized to filter speckle noise from the range-theta (Rθ) signal at the input to the scan converter 5 or Location A of FIG. 1 as well as the saved display data in X-Y coordinates which facilitates the retrofitting of existing or installed ultrasound equipment. In new equipment design it is possible to include the subject speckle filtering in the range-theta portion of the equipment after scan converter 5, or location B of FIG. 1. The wavelets utilized may be of various types including Haar Wavelets, or alternatively Daubechies wavelets of the type discussed in "The Wavelet Transform, true-frequency localization and signal analysis" by I. Daubechies, IEEE Trans. Info, Theory, volume 41, pages 961–1005, 1990, incorporated herein by reference. The Daubechie wavelets utilize a smoothing filter and a detail filter, referred to as quadrature mirror filters.

The operation of threshold processor 38 is illustrated diagramatically in FIG. 7. Referring to FIG. 7, threshold level 50 of threshold processor 38 is set either manually or automatically as described above, and those wavelet components 52 above the threshold level and representing mostly true image signal 30 are kept and passed to inverse wavelet transform 42; while those wavelet components 54 representing mostly speckle or other signal dependent noise is zeroed out or discarded. While only certain preferred embodiments of the invention have been illustrated and described herein, many modifications and changes will occur to those skilled in the art. It is therefore, to be understood that the appended claims are intended to cover all such modifications and changes as fall within the true spirit and scope of the invention.

What we claim is:

1. An adaptive method for reducing signal dependent noise including speckle noise mixed with a true signal in a coherent imaging system signals such as medical ultrasound imaging signals comprising:

dividing the imaging system signal into an equal number of subintervals;

transforming each of said subintervals using discrete wavelet transform to provide wavelet transform coefficients;

identifying for each of said transformed subintervals which of said wavelet transform coefficients come from said noise or from said true signal through the use of adaptive non-linear thresholding;

selecting those wavelet transform coefficients which are identified as related to said true signal; and passing said true signal wavelet transform coefficients through an inverse discrete wavelet transform to provide an enhanced true signal with reduced noise.

2. The coherent imaging noise reduction method of claim 1 wherein said coherent imaging system is ultrasound equipment including an ultrasound transducer, and further including the additional step of producing said coherent imaging signal from said transducer.

3. The coherent imaging noise reduction method of claim 2 wherein said dividing of said imaging system signal is dividing into frequency-scale space subintervals.

4. The coherent imaging noise reduction method of claim 3 including the determination of the length of samples within a subinterval of time of said subintervals being based on the signal dynamics of said imaging system signal to provide adequate signal resolution.

5. The coherent imaging noise reduction method of claim 2 wherein said transforming of said subintervals into discrete wavelets transform domain provides wavelet localization in space and frequency.

6. The coherent imaging noise reduction method of claim 5 wherein said identification includes a display system providing a threshold level for each transformed subinterval above which each wavelet coefficient at each scale is considered as coming from said imaging system true signal, and the further step of passing to said display system only those wavelet coefficients which exceed said threshold level as wavelet coefficients which are primarily true signal.

7. The coherent imaging noise reduction method of claim 6 wherein said threshold is manually adjusted by considering the amount of wavelet coefficients due to noise which can be ignored without undue compromise of the resolution of said imaging system signal, and the additional step of zeroing out those wavelet coefficients below said threshold value.

8. The coherent imaging noise reduction method of claim 7 wherein the threshold level adjustment is manually varied while observing the video presentation of said image signal to obtain the threshold adjustment setting which provides maximum enhancement of said video presentation.

9. The coherent imaging noise reduction method of claim 6 wherein said identification is made automatic by providing threshold factor multipliers to automatically vary said threshold level for each wavelet scale.

10. The coherent imaging noise reduction method of claim 8 wherein the automatic identification is provided by varying said threshold for each of said subintervals based on wavelet coefficient energy at each wavelet scale.

11. The coherent imaging noise reduction method of claim 9 wherein said varying of said threshold level includes automatically searching the energy of the applicable subinterval at each scale for maximum and minimum energy levels within a preselected window and selecting a value which enhances said imaging system signal.

12. The coherent imaging noise reduction method of claim 6 wherein said wavelet components which pass said threshold level are inverse transformed to produce a speckle reduced image.

13. The coherent imaging noise reduction method of claim 12 wherein the inverse transformed wavelets are displayed on a visual display.

14. The coherent imaging noise reduction method of claim 6 wherein the wavelet transform includes selective time frequency representation to selectively enhance segments of said imaging signals.

15. The coherent imaging noise reduction method of claim 14 wherein said threshold level is provided based on wavelet coefficient energy for each scale and for each of said subintervals.

16. The coherent imaging noise reduction method of claim 15 including the additional step of zeroing out those wavelet coefficients below said threshold level.

17. The coherent imaging noise reduction method of claim 16 wherein the wavelet transform includes 2 sets of a series of parallel compute blocks and processing said subintervals on a vector basis to provide a hierarchical frequency scale-space representation of each wavelet.

18. The coherent imaging noise reduction method of claim 17 wherein said threshold includes statistical information for various selected scales, and the additional step of applying said statistical information to said threshold in response to the selected scale.

19. The coherent imaging noise reduction method of claim 18 including the additional step of providing said adaptive threshold based on the maximum and minimum energy of said wavelet coefficients.

20. The coherent imaging noise reduction method of claim 19 wherein said wavelets are selected from the group consisting of Daubechies and Haar wavelets.

21. The coherent imaging noise reduction method of claim 6 wherein said ultrasound equipment includes the production of a range theta imaging signal and a scan converter for converting said range theta imaging signal to display coordinates, and providing the noise reduced signal to the input of said scan converter.

22. The coherent imaging noise reduction method of claim 6 wherein said ultrasound equipment includes the production of a range theta imaging signal and a scan converter for converting said range theta imaging signal to display coordinates, and enhancing the true signal content of the output signal of said scan converter to provide a reduced noise signal and providing said reduced noise signal to said display system.

23. The coherent imaging noise reduction method of claim 22 wherein said noise reduction method is retrofitted into an existing coherent imaging system.

\* \* \* \* \*